(12) United States Patent
Chao et al.

(10) Patent No.: US 9,129,157 B2
(45) Date of Patent: Sep. 8, 2015

(54) METHOD FOR IMAGE-BASED STATUS DETERMINATION

(71) Applicant: QUALCOMM Incorporated, San Diego, CA (US)

(72) Inventors: Hui Chao, San Jose, CA (US); Jiajian Chen, San Jose, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 13/874,180

(22) Filed: Apr. 30, 2013

(65) Prior Publication Data

US 2014/0321698 A1 Oct. 30, 2014

(51) Int. Cl.
G06K 9/00 (2006.01)
G06T 7/00 (2006.01)
G06T 7/20 (2006.01)

(52) U.S. Cl.
CPC .......... *G06K 9/00624* (2013.01); *G06T 7/0018* (2013.01); *G06T 7/20* (2013.01)

(58) Field of Classification Search
None
See application file for complete search history.

(56) References Cited

U.S. PATENT DOCUMENTS

| 6,449,382 B1* | 9/2002 | Ciccolo et al. ............... 382/103 |
| 6,796,799 B1 | 9/2004 | Yoshiike et al. |
| 7,742,623 B1 | 6/2010 | Moon et al. |
| 7,941,269 B2 | 5/2011 | Laumeyer et al. |
| 8,280,105 B2 | 10/2012 | Kishikawa et al. |
| 8,331,729 B2* | 12/2012 | Park et al. ..................... 382/286 |
| 2009/0091571 A1* | 4/2009 | Zalewski ...................... 345/427 |
| 2009/0180583 A1* | 7/2009 | Park et al. ......................... 377/9 |
| 2012/0200411 A1 | 8/2012 | Best |
| 2013/0158941 A1* | 6/2013 | Yang et al. .................... 702/141 |
| 2015/0141043 A1 | 5/2015 | Abramson et al. |

FOREIGN PATENT DOCUMENTS

| GB | 2443739 A | 5/2008 |
| KR | 20130096785 A | 9/2013 |

OTHER PUBLICATIONS

Ihaddadene N., et al., "Real-time Crowd Motion Analysis", 19th International Conference on Pattern Recognition, 2008: ICPR 2008; Dec. 8-11, 2008, Tampa, Florida, USA, IEEE, Piscataway, NJ, Dec. 8, 2008, 4 pages.
International Search Report and Written Opinion—PCT/US2014/032355—ISA/EPO—Sep. 26, 2014.
Partial International Search Report—PCT/US2014/032355—ISA/EPO—Jun. 27, 2014.

(Continued)

*Primary Examiner* — Tsung-Yin Tsai
(74) *Attorney, Agent, or Firm* — Kilpatrick Townsend & Stockton LLP

(57) ABSTRACT

Methods, systems, computer-readable media, and apparatuses for image-based status determination are presented. In some embodiments, a method includes capturing at least one image of a moving path. At least one feature within the at least one image is analyzed and based on the analysis of the at least one feature, a direction of movement of the moving path is determined. In some embodiments, a method includes capturing an image of an inclined path. At least one feature within the image is analyzed and based on analysis of the at least one feature, a determination is made whether the image was captured from a top position relative to the inclined path or a bottom position relative to the inclined path.

22 Claims, 11 Drawing Sheets

(56) References Cited

OTHER PUBLICATIONS

Wang S., et al., "Detecting Stairs and Pedestrian Crosswalks for the Blind by RGBD Camera", 2012 IEEE International Conference on, IEEE, Oct. 4, 2012, pp. 732-739.

Winkler C., et al., "NaviBeam: Indoor assistance and navigation for shopping malls through projector phones", Jan. 1, 2011, 5 Pages, Retrieved from the Internet: URL: http://www.uni-ulm.de/fileadmin/website_uni_ulm/iui.inst.100/institut/Papers/Prof_Rukzio/2011/2011_winkler_mp2.pdf [retrieved on Jun. 13, 2014].

Xiong Y., et al., "Vision-Guided Autonomous Stair Climbing", Proceedings of the 2000 IEEE International Conference on Robotics & Automation Apr. 1, 2000, pp. 1842-1847.

* cited by examiner

METHOD FOR IMAGE-BASED STATUS DETERMINATION

BACKGROUND

Aspects of the disclosure relate to determining motion direction.

Increasingly, computing devices, such as smart phones, tablet computers, personal digital assistants (PDAs), and other devices, are capable of receiving location-based services (LBS). Location-based services are a general class of computer program-level services used to include specific controls for location and time data as control features in computer programs. As such, LBS provide information and have a number of uses in social networking today as, for example, an entertainment service accessible with mobile devices via mobile networks. LBS typically use geographical positional information of the mobile device to deliver content.

As an example of LBS, augmented reality (AR) ads may be placed at moving paths (e.g., an escalator, elevator, or moving sidewalk) within view of a camera on a mobile device. For example, AR ads may be placed along an escalator at a shopping mall, along a moving sidewalk at an airport, etc. Other examples may include handheld navigation on a mobile device directing a user at a moving path (e.g., an escalator) to either go up or down, or for scene parsing for robot vision. These examples may assist the vision impaired. However, a challenge exists in determining the motion direction of the moving path for purposes of placing AR ads, which may depend on the direction, in the appropriate locations at the moving path.

Embodiments of the invention provide improved techniques to address these problems.

BRIEF SUMMARY

These problems and others may be solved according to embodiments of the present invention, described herein. Embodiments of the invention solve problems associated with determining motion direction of a moving path and determining a location of a user relative to an inclined path.

Computer vision technologies may be used to detect attributes of a person(s) in relation to a moving path on an image captured by an image capture device. Typically, people standing on a moving path tend to face the same direction that the moving path is moving. As such, face detection technologies may be used to determine the direction of the moving path relative to the image capture device. A detected face of a person may be used to determine the forward direction of the moving (e.g., whether the moving path is travelling toward the image capture device or away from the image capture device). A profile of a person's face may also be used to determine the forward direction of the moving path.

In addition, the direction of the moving path may also be determined based on optical flow or feature matching to analyze adjacent frames in images or video captured by the image capture device. The location of the image capture device relative to an inclined path may also be determined (e.g. whether the image is captured from the top or bottom of a stairway or escalator). Contextual information such as viewing angles, from the point of view of the image capture device, of static items along the inclined path (e.g., picture frames on a wall adjacent to the inclined path) may also be used to make the determination.

Furthermore, a person's speed of motion on the moving path may be determined by tracking changes over time of the person(s) detected faces. All the mentioned techniques may be used in combination for inferring motion direction of the moving path, speed of the moving path, and relative position of an image capture device to an inclined path.

In some embodiments, a method for image-based status determination includes capturing at least one image of a moving path. The method further includes analyzing at least one feature within the at least one image. The method further includes, based on analysis of the at least one feature, determining a direction of movement of the moving path.

In some embodiments, the at least one feature comprises a body part of a person on the moving path.

In some embodiments, the at least one feature comprises an object adjacent to the moving path.

In some embodiments, the method further includes tracking and comparing the at least one feature between a plurality of the images.

In some embodiments, the method further includes displaying an advertisement along the moving path within a representation of the captured image based on the determined direction of movement of the moving path.

In some embodiments, the method further includes displaying navigation directions on a mobile device based on the determined direction of movement of the moving path.

In some embodiments, an apparatus for image-based status determination includes an image capture device coupled to a processor. The image capture device is configured to capture at least one image of a moving path. The processor is configured to analyze at least one feature within the at least one image. The processor is further configured to, based on analysis of the at least one feature, determine a direction of movement of the moving path.

In some embodiments, an apparatus for image-based status determination includes means for capturing at least one image of a moving path. The apparatus further includes means for analyzing at least one feature within the at least one image. The apparatus further includes means for, based on analysis of the at least one feature, determining a direction of movement of the moving path.

In some embodiments, a processor-readable medium comprising processor-readable instructions configured to cause a processor to capture an image of an inclined path. The instructions are further configured to cause the processor to analyze at least one feature within the image. The instructions are further configured to cause the processor to, based on analysis of the at least one feature, determine a direction of movement of the moving path.

In some embodiments, a method for image-based status determination includes capturing an image of an inclined path. The method further includes analyzing at least one feature within the image. The method further includes, based on analysis of the at least one feature, determining whether the image was captured from a top position relative to the inclined path or bottom position relative to the inclined path.

In some embodiments, the determining step comprises detecting an object adjacent to the inclined path and determining an angle of the object with respect to a horizon line.

In some embodiments, the method further includes determining a tilt angle of a device used to capture the image, and wherein determination of whether the image was from a top position or bottom position is further based on the tilt angle.

In some embodiments, the method further includes displaying an advertisement along the inclined path within a representation of the captured image based on the determined position from where the image was captured.

In some embodiments, the method further includes displaying navigation directions on a mobile device based on the determined position from where the image was captured.

In some embodiments, an apparatus for image-based status determination includes an image capture device coupled to a processor. The image capture device is configured to capture an image of an inclined path. The processor is configured to analyze at least one feature within the image. The processor is further configured to, based on analysis of the at least one feature, determine whether the image was captured from a top position relative to the inclined path or bottom position relative to the inclined path.

In some embodiments, an apparatus for image-based status determination includes means for capturing an image of an inclined path. The apparatus further includes means for analyzing at least one feature within the image. The apparatus further includes means for, based on analysis of the at least one feature, determining whether the image was captured from a top position relative to the inclined path or bottom position relative to the inclined path.

In some embodiments, a processor-readable medium comprising processor-readable instructions configured to cause a processor to capture an image of an inclined path. The instructions are further configured to cause the processor to analyze at least one feature within the image. The instructions are further configured to cause the processor to, based on analysis of the at least one feature, determine whether the image was captured from a top position relative to the inclined path or bottom position relative to the inclined path.

BRIEF DESCRIPTION OF THE DRAWINGS

Aspects of the disclosure are illustrated by way of example. In the accompanying figures, like reference numbers indicate similar elements, and.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
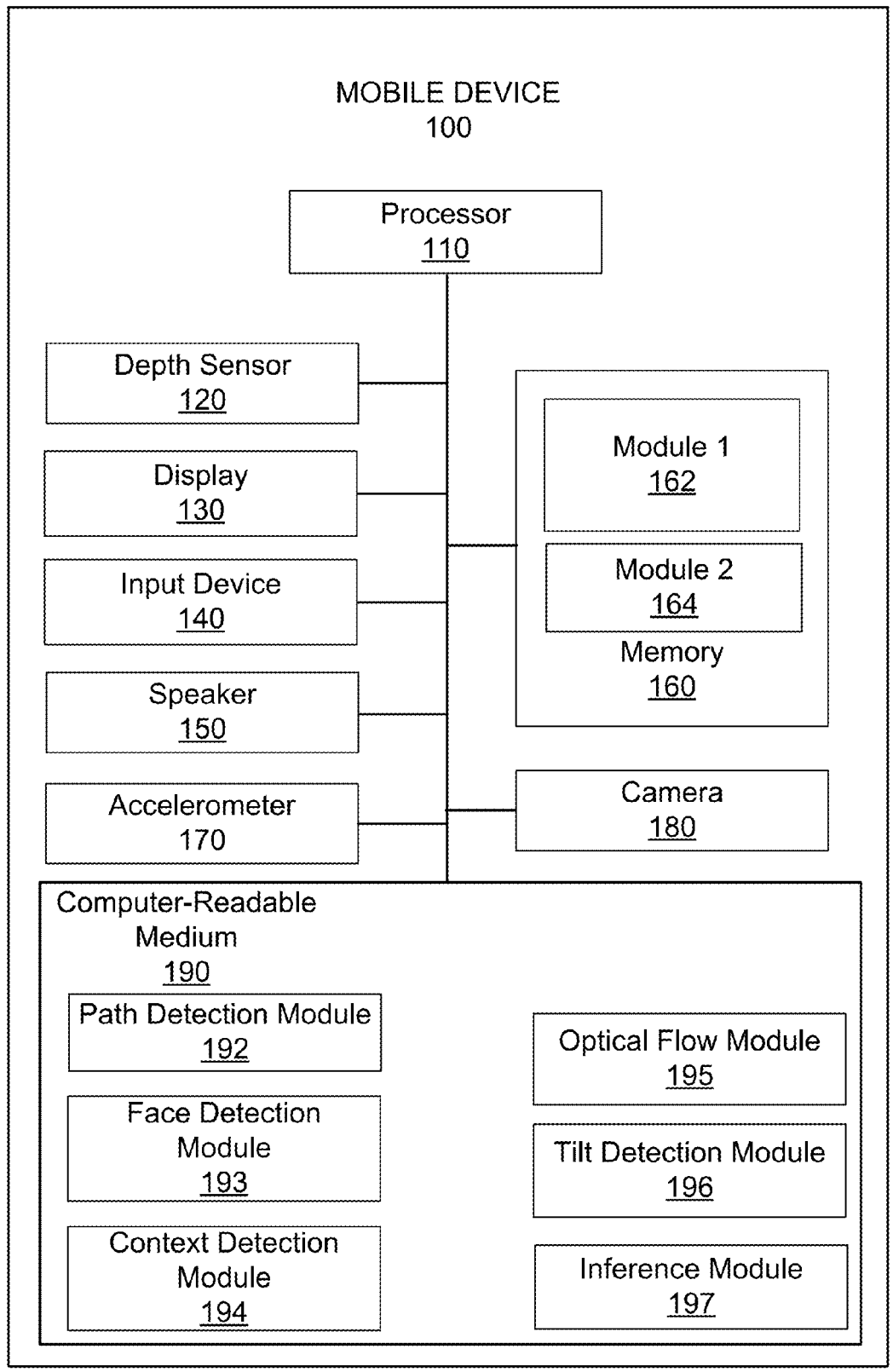
FIG. 1 illustrates a simplified block diagram of a mobile device that may incorporate one or more embodiments.

FIG. 1 illustrates a simplified block diagram of a mobile device 100 that may incorporate one or more embodiments. Mobile device 100 includes a depth sensor 120, display 130, input device 140, speaker 150, memory 160, accelerometer 170, and camera 180.

Processor 110 may be any general-purpose processor operable to carry out instructions on the mobile device 100. The processor 110 is coupled to other units of the mobile device 100 including depth sensor 120, display 130, input device 140, speaker 150, memory 160, accelerometer 170, camera 180, and computer-readable medium 190.

Depth sensor 120 is a sensor within mobile device 100 operable for determining depth calculations within a still or continuous image captured by camera 180. The depth sensor 120 may include an infrared laser projector combined with a complementary metal-oxide-semiconductor (CMOS) sensor which in combination work together to "see" a physical environment captured in the image regardless of lighting conditions. In some embodiments, depth sensor 120 may be internal to camera 180.

Display 130 may be any device that displays information to a user. Examples may include an LCD screen, CRT monitor, or seven-segment display.

Input device 140 may be any device that accepts input from a user. Examples may include a keyboard, keypad, or mouse. In some embodiments, camera 180 may be considered an input device 140.

Speaker 150 may be any device that outputs sound to a user. Examples may include a built-in speaker or any other device that produces sound in response to an electrical audio signal. In some embodiments, speaker 150 may be used to provide an audio cue corresponding to an augmented reality advertisement.

Memory 160 may be any magnetic, electronic, or optical memory. Memory 160 includes two memory modules, module 1 162 and module 2 164. It can be appreciated that memory 160 may include any number of memory modules. An example of memory 160 may be dynamic random access memory (DRAM).

Accelerometer 170 is a device configured to sense movement and gravity. Accelerometer 170 may be used to calculate a tilt angle and orientation of the mobile device 100.

Camera 180 is an image capture device configured to capture images. Camera 180 may capture either still images or continuous images (video). In some embodiments, camera 180 may include depth sensor 120.

Computer-readable medium 190 may be any magnetic, electronic, optical, or other computer-readable storage medium. Computer-readable storage medium 190 includes path detection module 192, face detection module 193, context detection module 194, optical flow module 195, tilt detection module 196, and inference module 197.

Path detection module 192 is configured to detect a moving path or inclined path in an image within camera 180 view of the mobile device 100. Path detection module 192 may analyze the image within the camera 180 view and determine whether a moving path or inclined path is present within the image. Path detection module 192 may make use of depth sensor 120 and accelerometer 170 in making this determination. Objects within the image may be analyzed using object recognition technologies to determine their object type. Once path detection module 192 detects a moving path in the image, path detection module 192 may communicate with face detection module 193, context detection module 194, optical flow module 195, tilt detection module 196, and inference module 197 to infer motion direction of the moving path.

Face detection module 193 is configured to identify a person's face from an image within camera 180 view of the mobile device 100. Face detection module 193 is able to detect facial features from the image and track the identified face(s) to determine a person(s) direction along the moving path. Face detection module 193 may communicate with inference module 197 to determine a direction and speed of the moving path based on the detected face(s).

Context detection module 194 is configured to analyze contextual information from an image within camera 180 view of the mobile device 100. Context information may include picture frames or other objects along a moving path that may be analyzed. The context detection module 194 may communicate with inference module 197 to determine a relative location of a user of the mobile device 100 to a moving path or inclined path.

Optical flow module 195 is configured to analyze adjacent frames in continuous images (video) within camera 180 view of the mobile device 100. Optical flow module 195 may communicate with inference module 197 to determine direction of the moving path based on the analyzed adjacent frames. For example, it may be determined whether the moving path is moving in a direction toward or away from the user of the mobile device 100.

Tilt detection module 196 is operable to determine a tilt angle of the mobile device 100. Tilt detection module 196 may receive movement and gravity data from accelerometer 170. The received data may be used to determine an angle at which the user is holding the mobile device 100. Tilt detection module 196 may communicate with inference module 197 to determine the user's position relative to an inclined path (e.g., whether the user is at the top or bottom of the inclined path).

Inference module 197 is configured to infer a motion direction of a moving path or the user's position relative to an inclined path. Inference module 197 may communicate with path detection module 192, face detection module 193, context detection module 194, optical flow module 195, and inference module 197 to infer the motion direction of the moving path or the user's position relative to the inclined path. Based on data received from the various modules, the inference module 197 may make a logical inference. It can be appreciated that data may be received by the inference module 197 from one more of the other modules and the received data may be combined to make the inference. In some embodiments, augmented reality advertisements may be presented to the user within camera 180 view of the mobile device 100 based on the inference. In some embodiments, handheld navigation directions may be provided to the user instruction them with a direction to follow on the moving path or inclined path based on the inference.

In some embodiments, the mobile device 100 may be in communication with a content provider (not shown). The content provider may provide augmented reality advertisements for the mobile device 100 to display to the user. The selection of advertisements displayed may be based upon the inference of motion direction of the moving path made by inference module 197.

Figure 2:
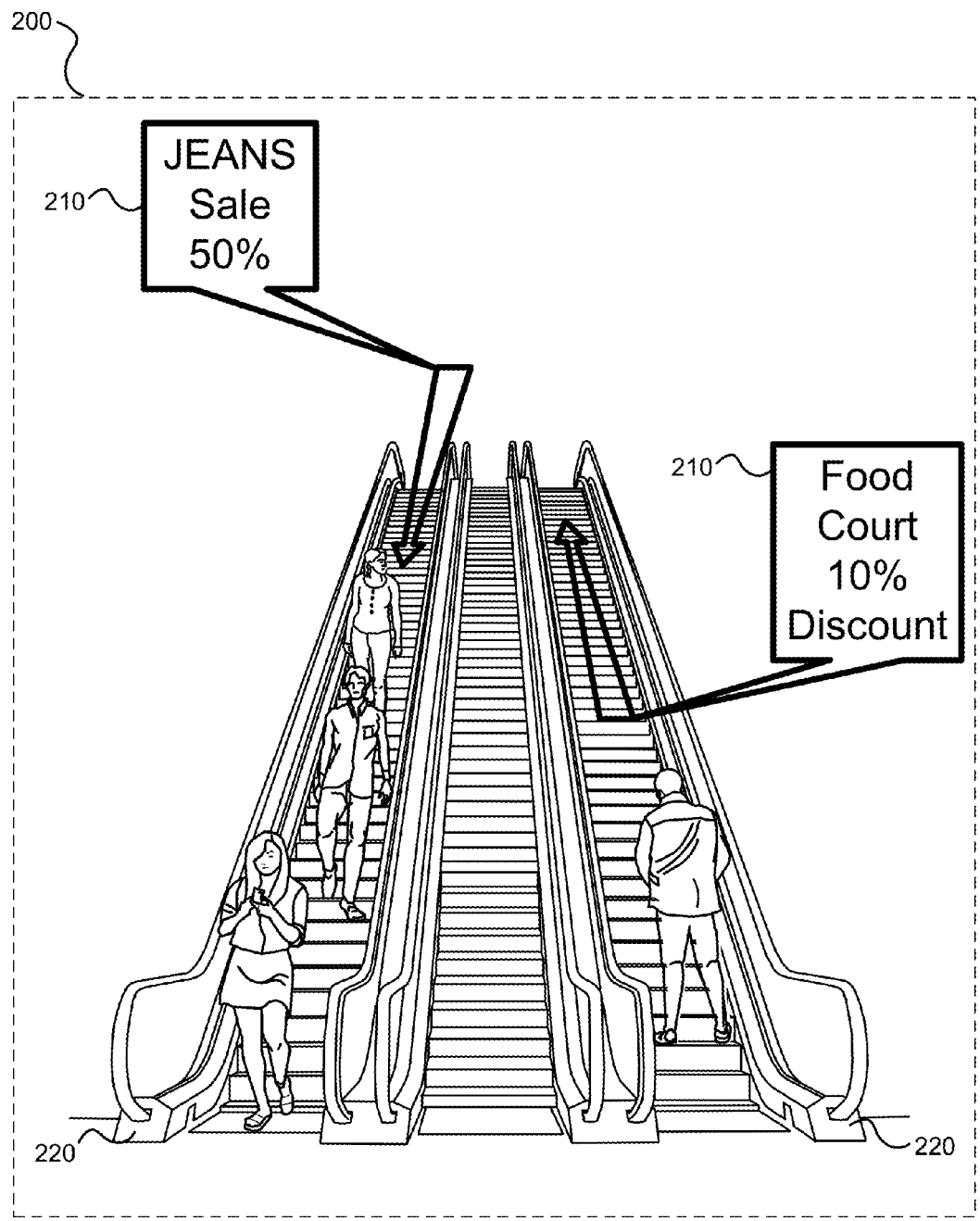
FIG. 2 illustrates augmented reality advertisements placed along a moving path, in accordance with some embodiments.

FIG. 2 illustrates augmented reality advertisements 210 placed along a moving path 220 within a camera view 200, in accordance with some embodiments. The camera view 200 may be captured by camera 180 (FIG. 1) and shown to a user, in real-time, on display 130. In this particular example, the user may be standing in front of moving path 220 while pointing mobile device 100 (FIG. 1) toward the moving path 220 in such an orientation that camera 180 (FIG. 1) may capture the moving path 220. Further, in this example, the moving path 220 is an escalator.

Content providers of augmented reality advertisements may wish to have relevant augmented reality advertisements display on the user's mobile device's 100 (FIG. 1) camera view 200 of the moving path 220. That is, the augmented reality advertisements should be appropriately placed based on which direction the moving path is travelling. If a certain feature to be advertised is available by travelling up the moving path 220, that feature's advertisement should be properly placed indicating to the user the proper path to take along the moving path 220.

Often times, moving path 220 information is not included in indoor navigation data and as such it is difficult to determine the direction of the moving path for proper placement of the advertisements, especially if the moving path is bi-directional. An escalator may be considered bi-directional because the operator of the escalator may choose to reverse the travelling direction if they see fit, such as changing direction based on daily usage traffic. Thus, the augmented reality advertisements may need to be dynamically placed based on the motion direction of the moving path 220. For example, in the figure, a food court within a shopping mall is located a level above where the user is currently standing and an apparel store is having a sale on jeans either at the floor the user is on or a floor below. As such, augmented reality advertisements 210 are placed indicating this to the user. One advertisement indicates to the user, "Food Court 10% Discount" with a directional arrow superimposed on the moving path 220 within the mobile device's 100 (FIG. 1) camera view 200.

Additionally, the use of a handheld indoor navigation application on the mobile device 100 (FIG. 1) may require a correct determination of the motion direction of the moving path 220. Often times it is difficult to determine motion direction of a moving path 220 based on viewing the moving path 220 alone in the camera view 200 of the mobile device 100 (FIG. 1). Furthermore, it may also be difficult to estimate the user's location relative to the moving path 220 (e.g., at the top or bottom of the moving path) based on viewing the moving path 220 alone in the camera view 200 of the mobile device 100 (FIG. 1).

The techniques described above may be used either alone or in combination to infer a motion direction of the moving path 220 or a position of the user of the mobile device relative to an inclined path. Once the direction of the moving path 220 is determined, the augmented reality advertisements from the content provider may be appropriately superimposed on the moving path 220 within the mobile device's 100 (FIG. 1) camera 180 (FIG. 1) view. The augmented reality advertisements from the content provider may also be superimposed on an inclined path based on the position of the user relative to the inclined path. For example, if the user is determined to be at the top of an inclined path, relevant augmented reality advertisements may be placed for stores/items located at the bottom of the inclined path. These techniques used for motion direction and user position detection include, but are not limited to: face detection, context detection, optical flow or feature matching, and tilt detection.

Determination of Motion Direction of Moving Path

Figure 3:
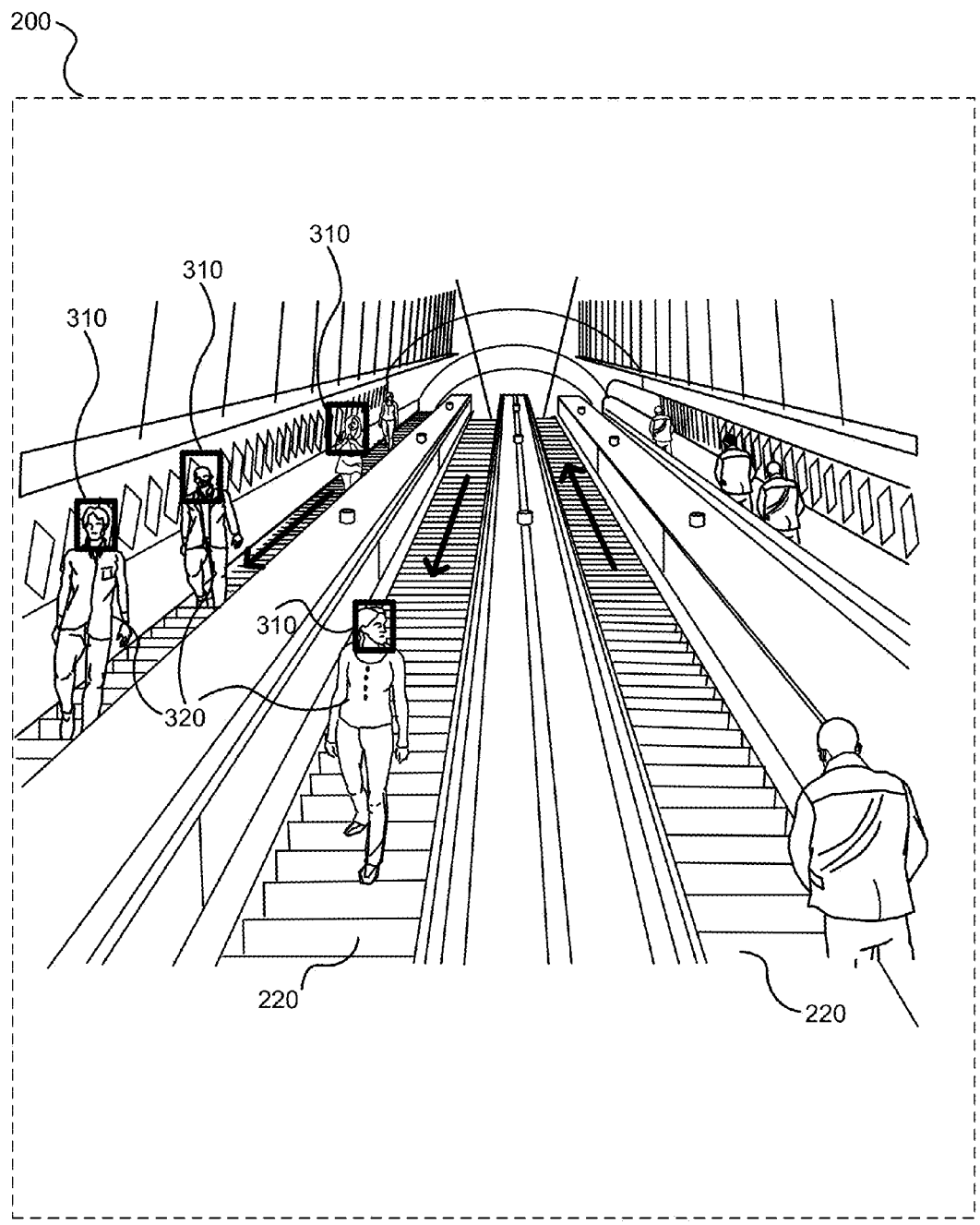
FIG. 3 illustrates inferring motion direction of a moving path by using face detection, in accordance with some embodiments.

FIG. 3 illustrates inferring motion direction of a moving path 220 by using face detection, in accordance with some embodiments. Face detection technologies are well known in the art. As described above, moving path 220 (escalator) is within a camera view 200 of the user's mobile device 100 (FIG. 1). The camera view 200 of the moving path 220 may be displayed to the user in real-time via the display 130 (FIG. 1)

of the mobile device 100. Without person(s) 320 on the moving path, it may be difficult to determine a motion direction of the moving path 220. However, when person(s) are travelling along the moving path 220, face detection may be used to determine the motion direction of the moving path 220.

As mentioned above, face detection module 193 (FIG. 1) is configured to identify a person's face from an image within camera view 200 of the mobile device 100 (FIG. 1). Face detection module 193 (FIG. 1) is able to detect facial features from the image of the moving path 220 in the camera view 200 and track identified face(s) of the persons(s) to determine their motion direction along the moving path 220. Once the moving path 220 is identified by path detection module 192 (FIG. 1), face detection module 193 (FIG. 1) may perform the face detection analysis. In some embodiments, path detection module 192 (FIG. 1) may also be configured to identify lanes on the moving path 220. For example, path detection module 192 (FIG. 1) may identify lanes in the escalator. In this figure, there are two lanes travelling upward (to the right of the center of camera view 200) and two lanes travelling downward (to the left of the center of camera view 200).

The face detection module 193 (FIG. 1) may detect that a lane of the escalator is moving toward the user by detecting face(s) 310 of the person(s) 320 on travelling along the moving path 220. If multiple face(s) 310 are detected on a particular lane of the escalator, it may be inferred that the particular lane of the escalator is travelling toward the user. In this example, three face(s) 310 are detected in the leftmost lane and one face is detected in the second to left lane. It can be appreciated that the inference that the lane is travelling toward the user may still be made if only one face 310 is detected along the moving path 220. The minimum number of face(s) 310 that needs to be detected to make the inference that the lane is travelling toward the user may be associated with a predetermined confidence level. Since most person(s) travel down an escalator facing the direction of travel, the inference that the lane is travelling toward the user based on the detected face(s) 310 may be made with a relative amount of confidence.

If the face detection module 193 (FIG. 1) detects random motion in the image within the camera view 200 of the mobile device 100 (FIG. 1), an inference may be made that the lane is travelling away from the user. In this example, no faces are detected in the rightmost lane and the second to right lane. The minimum amount of random motion needed to be detected to make the inference that the lane is travelling away from the user may be associated with a predetermined confidence level. Since most people travel up an escalator facing the direction of travel, the inference that the lane is travelling away from the user based on the random motion detected may be made with a relative amount of confidence.

In some embodiments, face detection module 193 (FIG. 1) may be configured to detect face(s) 310 over a period of time and determine whether the faces are getting larger within the camera view 200. If the faces are getting larger within the camera view 200, it can be inferred that the lane of the moving path 220 is moving toward the user.

In some embodiments, face detection module 193 (FIG. 1) communicates obtained face detection data to the inference module 197 (FIG. 1) for purposes of making the inference of the motion direction of the moving path 220.

Figure 4:
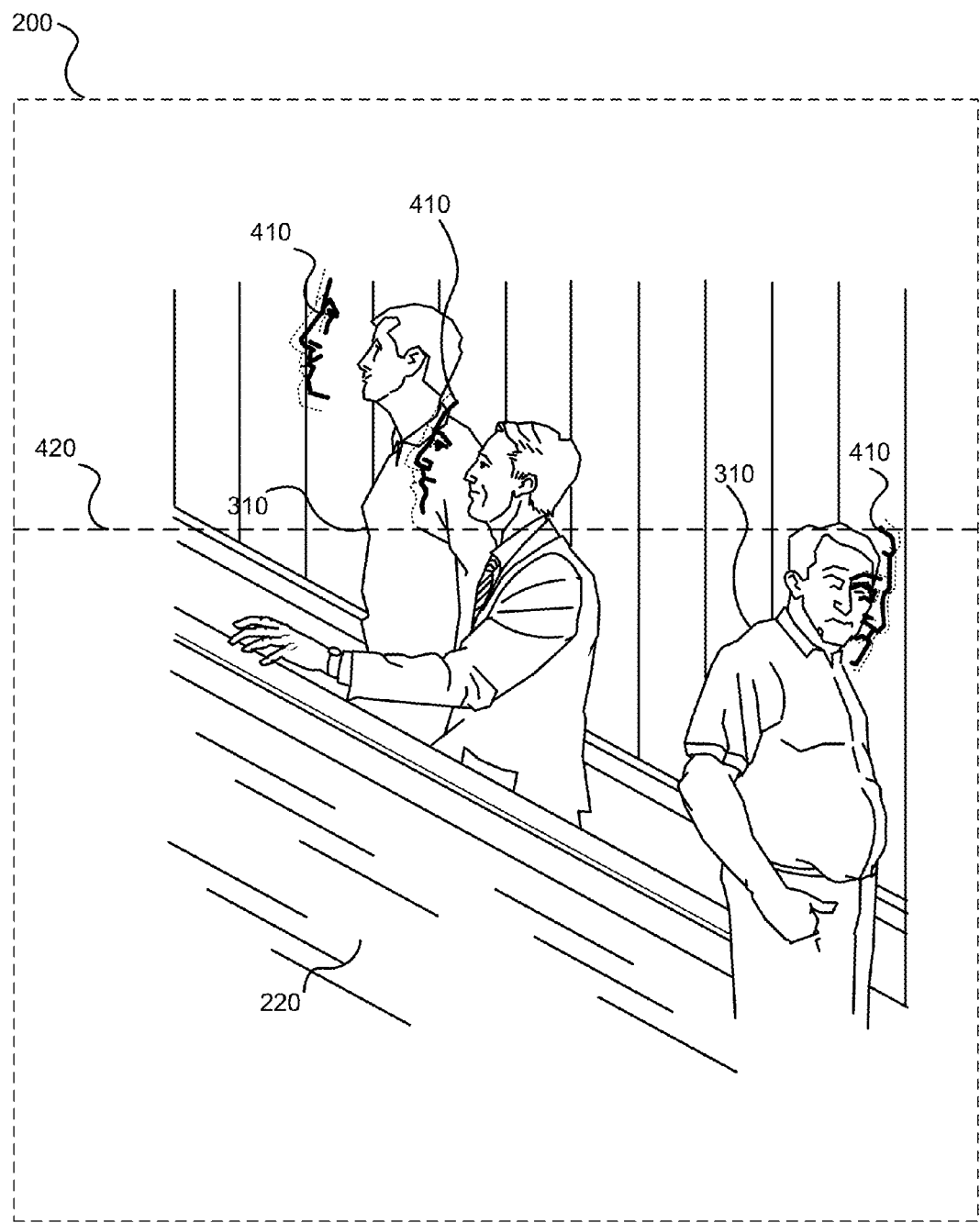
FIG. 4 illustrates inferring motion direction of a moving path by using face detection from a side profile, in accordance with some embodiments.

FIG. 4 illustrates inferring motion direction of a moving path 220 by using face detection from a side profile, in accordance with some embodiments. As described above, face detection module 193 (FIG. 1) is configured to identify a person's face from an image within camera view 200 of the mobile device 100 (FIG. 1). Face detection module 193 (FIG. 1) can also identify a side profile face 410 of a person(s). By determining angle of the side profile face 410 of a person(s), the motion direction of a moving path 220 (e.g., escalator) may be determined.

Most people stand upright to the ground with their body perpendicular to the ground plane and face upward when travelling upward and face downward when travelling downward along the moving path 220. This assumption may be used in determining the top and bottom of the moving path 220 and the motion direction of the moving path 220.

A person's side profile face 410 angled at a positive angle with respect to a horizon line 420 may indicate that the person is facing toward the top of the moving path 220 and that the moving path 220 has a motion direction travelling upward. A person's side profile face 410 angled at a negative angle with respect to a horizon line 420 may indicate that the person is facing toward the bottom of the moving path 220 and that the moving path 220 has a motion direction travelling downward. For example, in the figure, the two left person(s) have a side profile face 410 angled at a positive angle with respect to horizon line 420 and are thus travelling upward toward the top of the moving path 220. The right person has a side profile face 410 angled at a negative angle with respect to horizon line 420 and is thus travelling downward toward the bottom of the moving path 220.

It can be appreciated that the mobile device 100 may employ edge detection techniques for determining the orientation of the moving path 220. Edge detection techniques are well known in the art and aim at identifying points within the image that have discontinuities. For example, edge detection techniques may be employed on the image within camera view 200 of the mobile device 100 (FIG. 1) to determine edges of the moving path 220. The location of the detected edges may be further used to determine the orientation of the moving path 220 (escalator). Face detection module 193 (FIG. 1) may communicate this information to inference module 197 (FIG. 1).

Figure 5:
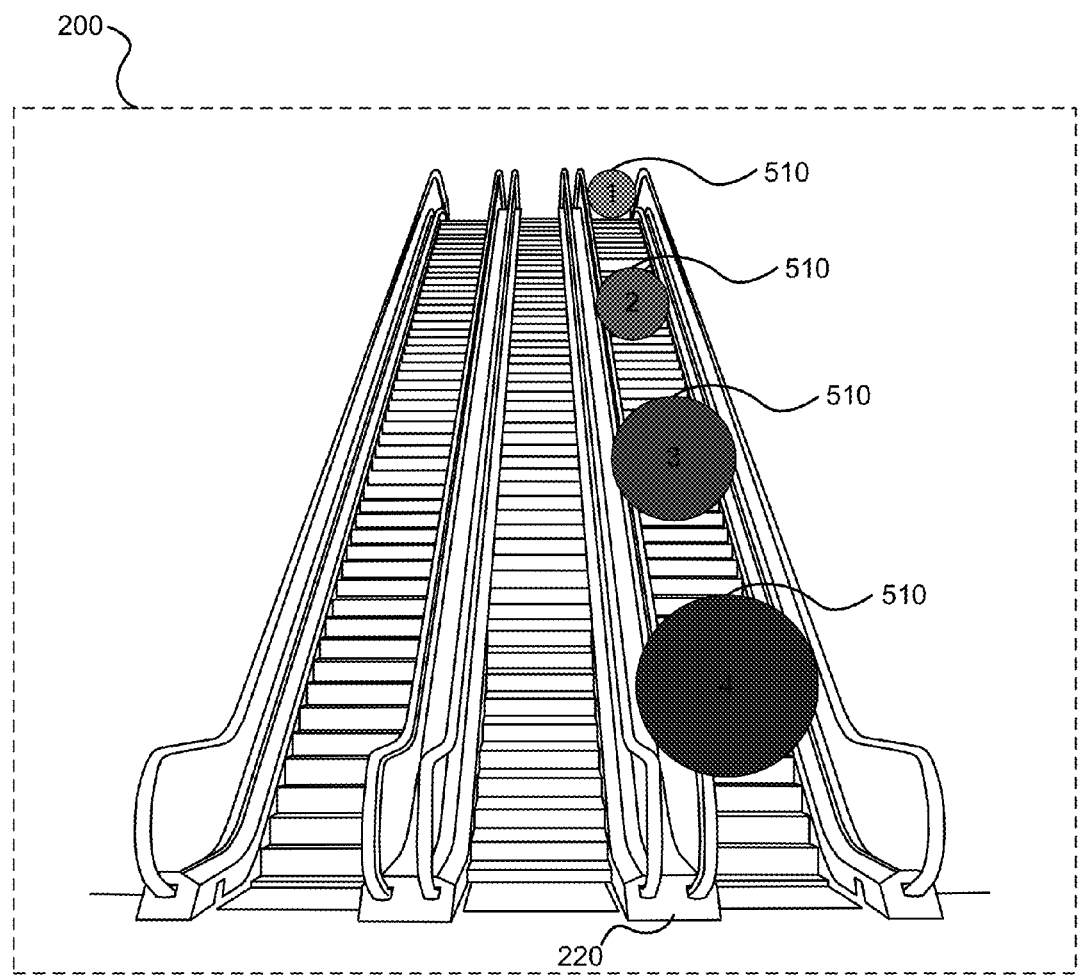
FIG. 5 illustrates inferring motion direction of a moving path by using optical flow or feature tracking, in accordance with some embodiments.

FIG. 5 illustrates inferring motion direction of a moving path by using optical flow or feature tracking, in accordance with some embodiments. As described above, optical flow module 195 (FIG. 1) is configured to analyze adjacent frames in continuous images (video) within camera view 200 of the mobile device 100. Optical flow module 195 (FIG. 1) may communicate with inference module 197 (FIG. 1) to determine direction of the moving path based on the analyzed adjacent frames. For example, it may be determined whether the moving path is moving in a direction toward or away from the user of the mobile device 100 (FIG. 1).

Optical flow is the pattern of apparent motion of objects, surfaces, and edges in a visual scene caused by the relative motion between the camera 180 (FIG. 1) and the scene. Optical flow techniques are well known in the art. Assuming that the mobile device 100 (FIG. 1) is not moving, by tracking the movement of features within the camera view 200, an inference may be made regarding the motion of an object within the camera view 200. For example, referring to the figure, the optical flow module 195 (FIG. 1) tracks an object 510 within the camera view 200 over four frames. It can be appreciated that the object may be tracked over any number of frames. The object may be a person travelling along the moving path 220 or any other object such as something being held by a person on the moving path 220 or a shopping cart, etc. Over each subsequent frame, the object 510 becomes larger and has a darker gradient. That is, the object 510 is smallest and lightest in the first frame (frame 1) and is largest and darkest in the last frame (frame 4). The optical flow module 195 (FIG. 1) can detect the change in shading and size of the object 510 over the frames and determine that the object is getting closer to the viewpoint (camera) over subsequent frames.

This information may be communicated from optical flow module 195 (FIG. 1) to inference module 197 (FIG. 1) and inference module 197 (FIG. 1) may determine that the moving path 220 has a motion direction toward the user holding the mobile device 100 (FIG. 1) since the object 510 is becoming larger and darker over subsequent frames.

Determination of User's Position Relative to an Inclined Path

Figure 6A:
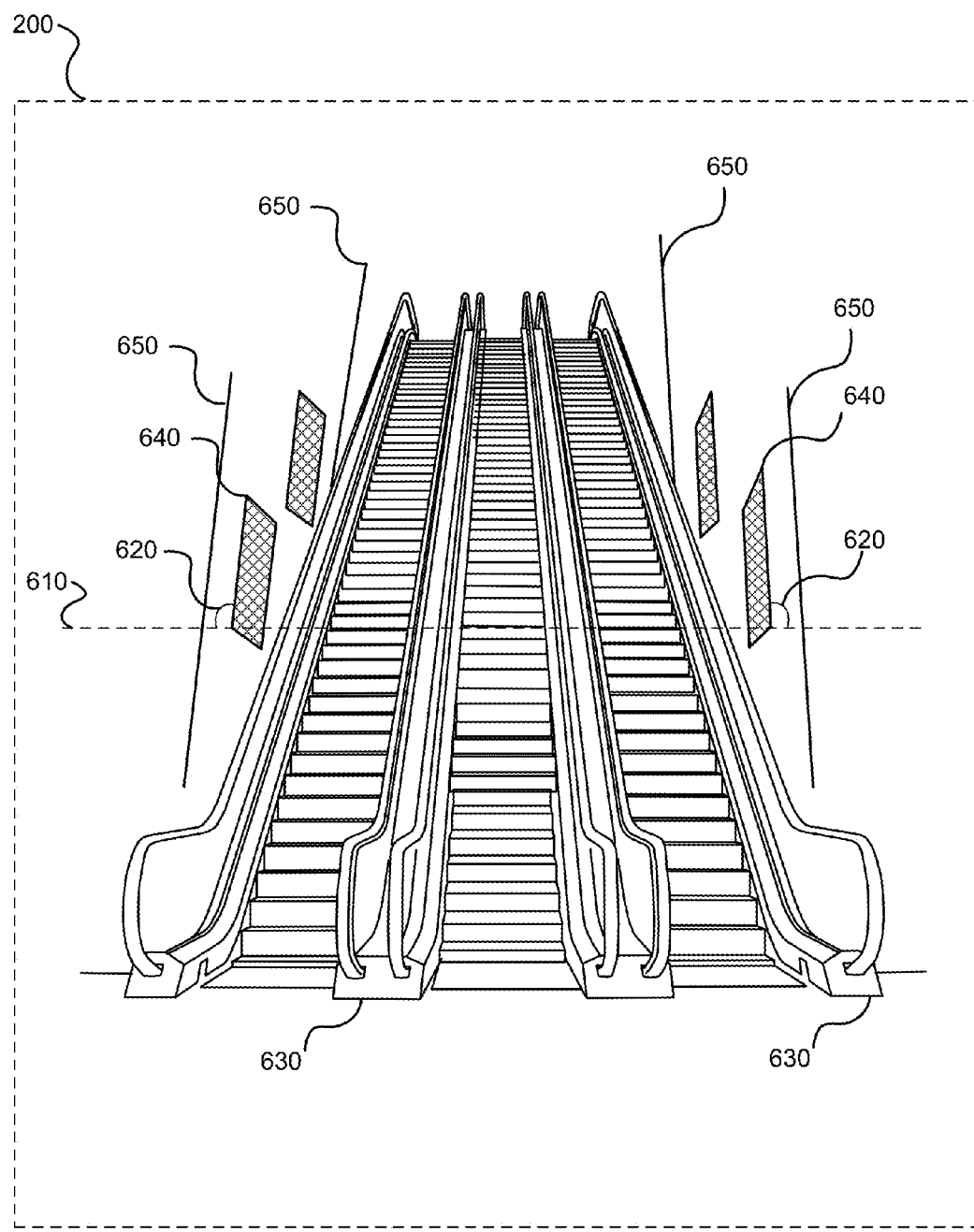
FIGS. 6A-6B illustrate inferring a position of a user relative to an inclined path by using contextual information, in accordance with some embodiments.

FIG. 6A illustrates inferring a position of a user relative to an inclined path 630 by using contextual information, in accordance with some embodiments. As mentioned above, context detection module 194 is configured to analyze contextual information from an image within camera view 200 of the mobile device 100. Context information may include picture frames 640 or other objects along an inclined path 630 that may be analyzed.

By analyzing the contextual information, a user's location relative to the inclined path 630 may be determined (e.g., whether the user holding the mobile device is located at the top of the inclined path 630 or the bottom of the inclined path 630). Contextual information such as rectangular picture frames 640 located on a wall adjacent to the inclined path 630 may be analyzed to determine whether the mobile device 100 is angled upward towards an upward inclined path 630 or towards a downward inclined path 630. The analysis may be performed by analyzing the perspective transformation of the picture frames 640.

The perspective transformation of the picture frames 640 may be analyzed by determining the angle 620 between the picture frames 640 and a horizon line 610 which is parallel to the edges of the inclined path. The angles 620 are angles measured between an imaginary line 650 that is considered to be vertical within camera view 200, such as the side of a picture frame 640. In an example using the side of a picture frame 640, the angle is measured between the side of the picture frame and the horizon line 610 perpendicular to the inclined path 630. If the angles 620 are greater than or equal to 90 degrees with respect to the horizon line 610, an inference may be made that the user is located at the bottom of the moving path 220. In this example, the picture frames 640 adjacent to the escalator have an angle 620 greater than 90 degrees with respect to the horizon line 610, leading the inference that the user is located at the bottom of the escalator. In some embodiments, the angle may also be the measured angle between the side of the picture frame and the opposite side of the horizon line 610, that is 180 degrees minus angle 620. In that case, if the calculated angle is greater than or equal to 90 degrees, an inference may be made that the user at the top of the inclined path 630. If the calculated angle is less than 90 degrees, an inference may be made that the user at the bottom of the inclined path 630. It can be appreciated that any object other than a picture frame may be used for determining the angle.

In some embodiments, the position of the user relative to the inclined path may be determined by creating an imaginary trapezoid using the imaginary vertical lines 650 on the left to the vertical lines 650 on the right. If the bottom line of the trapezoid is smaller than the upper line of the trapezoid, an inference may be made that the user is at a bottom position of the inclined path 630. If the bottom line of the trapezoid is larger than the upper line of the trapezoid, an inference may be made that the user is at a top position of the inclined path 630.

It can be appreciated that the horizon line 610 may be near parallel to the ground plane, and the camera plane may be near parallel to vertical lines 650 and perpendicular to the ground plane in a typical real world coordinate system. Due to the projective transformation in the camera view 200, when the user is at the bottom of the inclined path 630, the bottom corner of the picture frame 640 will be closer to the mobile device than the top corner of the picture frame 640. Accordingly, the angle 620 between vertical lines 650 and horizon line 610 tends to be larger than 90 degrees. When the user is on the top of the inclined path 630 (see FIG. 6B), the opposite effect occurs. The top of the picture frame 640 will be closer to the user than the bottom of the picture frame 640, and therefore the angle 622 tends to be smaller than 90 degrees.

It can be appreciated that the contextual information used for determining angles and ultimately inferring where the user is located can be any object having edges placed adjacent to the inclined path 630. It can also be appreciated that using the context detection module 194 to analyze contextual information may also be used to determine the location of a user with respect to an inclined path (e.g., a staircase).

Accordingly, as described above, based on the inference that the user is located at the bottom of the inclined path 630, an augmented reality advertisement or navigation directions may be displayed within camera view 200 showing features that may be located at a level below the user's current location.

Figure 6B:
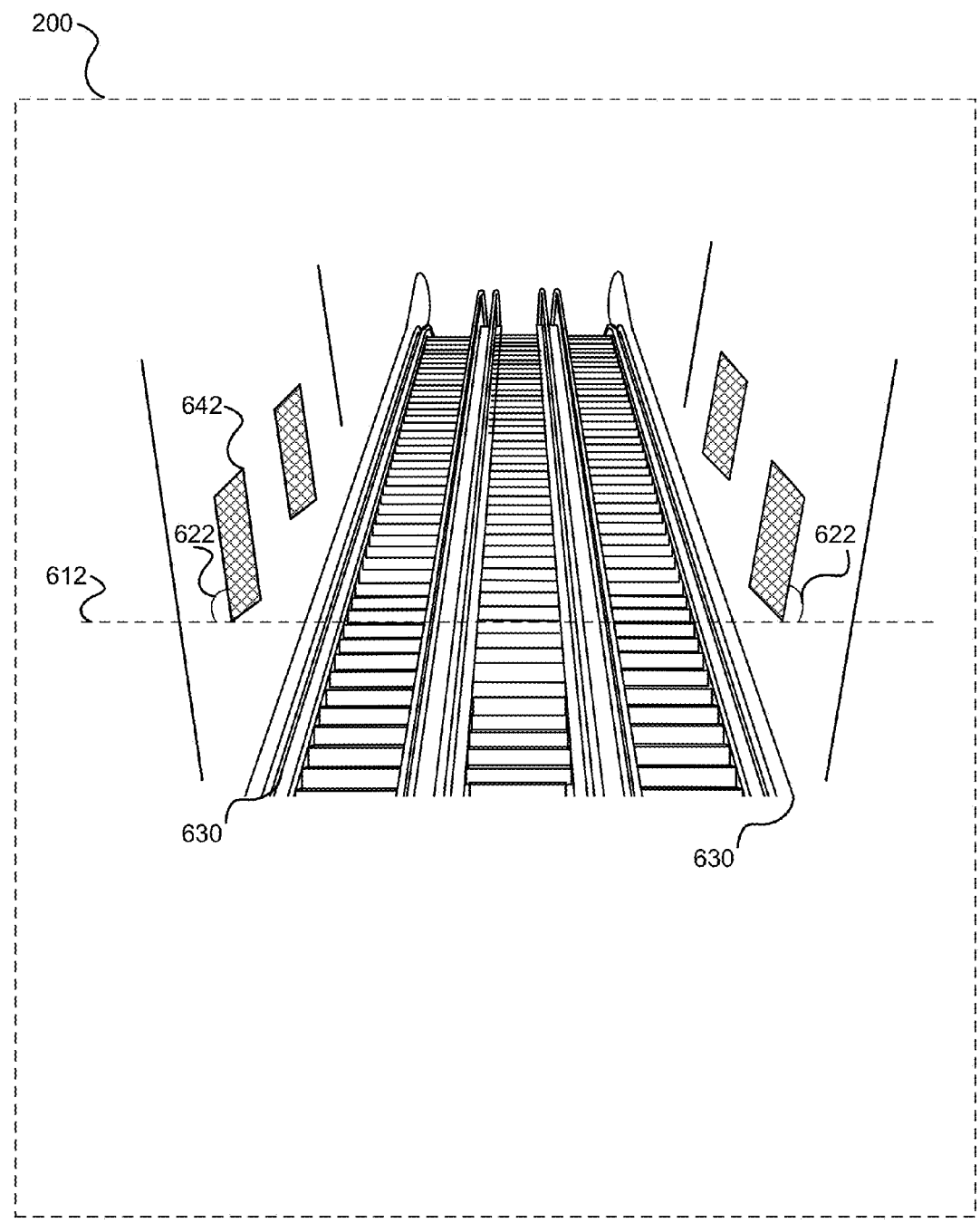

FIG. 6B illustrates inferring a position of a user relative to an inclined path 630 by using contextual information, in accordance with some embodiments. As mentioned above, context detection module 194 is configured to analyze contextual information from an image within camera view 200 of the mobile device 100. Context information may include picture frames 642 or other objects along an inclined path 630 that may be analyzed.

As mentioned above, By analyzing the contextual information, a user's location relative to the inclined path 630 may be determined (e.g., whether the user holding the mobile device is located at the top of the moving path 220 or the bottom of the inclined path 630). In contrast with FIG. 6A, in FIG. 6B, it can be seen that the angles 622 between the side of the picture frame 642 and the horizon line 612 are less than 90 degrees and as described above, an inference may be made that the user is located at the top of the inclined path 630. The picture frames 642 adjacent to the escalator have an angle 622 less than 90 degrees with respect to the horizon line 610.

Accordingly, as described above, based on the inference that the user is located at the top of the inclined path 630, an augmented reality advertisement or navigation directions may be displayed within camera view 200 showing features that may be located at a level above the user's current location.

Figure 7:
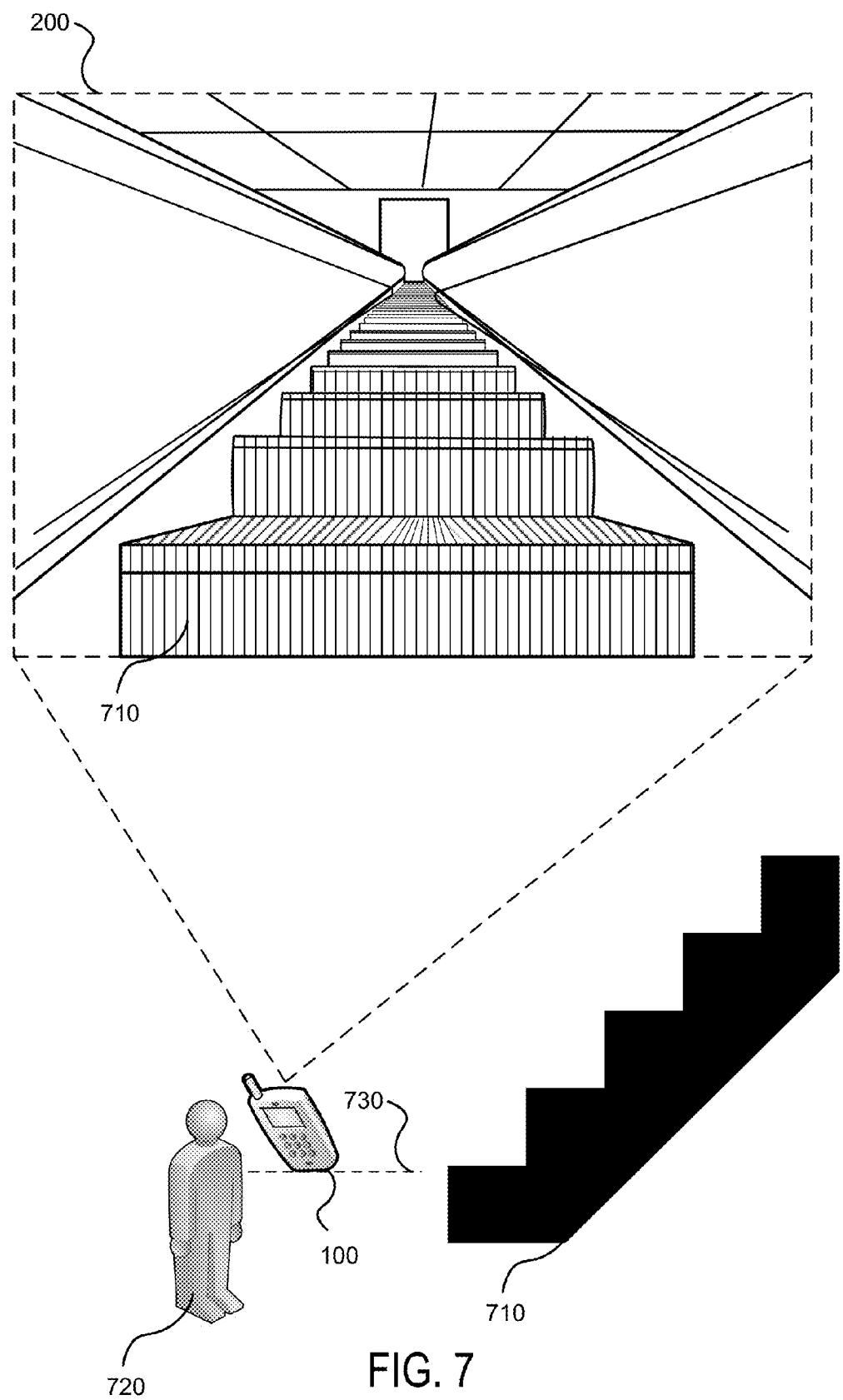
FIG. 7 illustrates inferring a location of a user in relation to an inclined path by using tilt detection, in accordance with some embodiments.

FIG. 7 illustrates inferring a location of a user in relation to an inclined path 710 by using tilt detection, in accordance with some embodiments. In this case, the inclined path 710 is a staircase within camera view 200 of the mobile device 100 (FIG. 1). As mentioned above, tilt detection module 196 (FIG. 1) is operable to determine a tilt angle of the mobile device 100 (FIG. 1). Tilt detection module 196 (FIG. 1) may receive movement and gravity data from accelerometer 170 (FIG. 1). The received data may be used to determine an angle at which the user is holding the mobile device 100. Tilt detection module 196 may communicate with inference module 197 (FIG. 1) to determine the user's position relative to an inclined path (e.g., whether the user is at the top or bottom of the inclined path).

In this embodiment of the invention, it may be assumed that when a user is pointing his/her mobile device 100 (FIG. 1) at the inclined path 710, they are tilting the mobile device 100

(FIG. 1) backward to capture the inclined path 710 if they are the bottom of the inclined path 710. Similarly, the user is tilting the mobile device 100 (FIG. 1) forward to capture the inclined path 710 if they are the top of the inclined path 710.

In the figure, the camera view 200 of the mobile device 100 (FIG. 1) shows an inclined path 710 with stairs going upward to a higher elevation. The user 720 is positioned at the bottom of the inclined path 710 (staircase). To capture an image of the inclined path 710 the user 720 uses his/her mobile device's 100 rear-facing camera (not shown). Since the inclined path 710 is going upward, the user naturally tilts the mobile device 100 toward him or her, or backward with respect to horizon line 730 in order to capture the inclined path 710 properly. The accelerometer 170 (FIG. 1) within the mobile device 100 communicates movement and gravity data to the tilt detection module 196 (FIG. 1). The tilt detection module 196 (FIG. 1) determines that the user is tilting the mobile device 100 backward and communicates this information to the inference module 197 (FIG. 1). The inference module 197 (FIG. 1) makes the inference that the user is located at the bottom of the inclined path 710.

Figure 8:
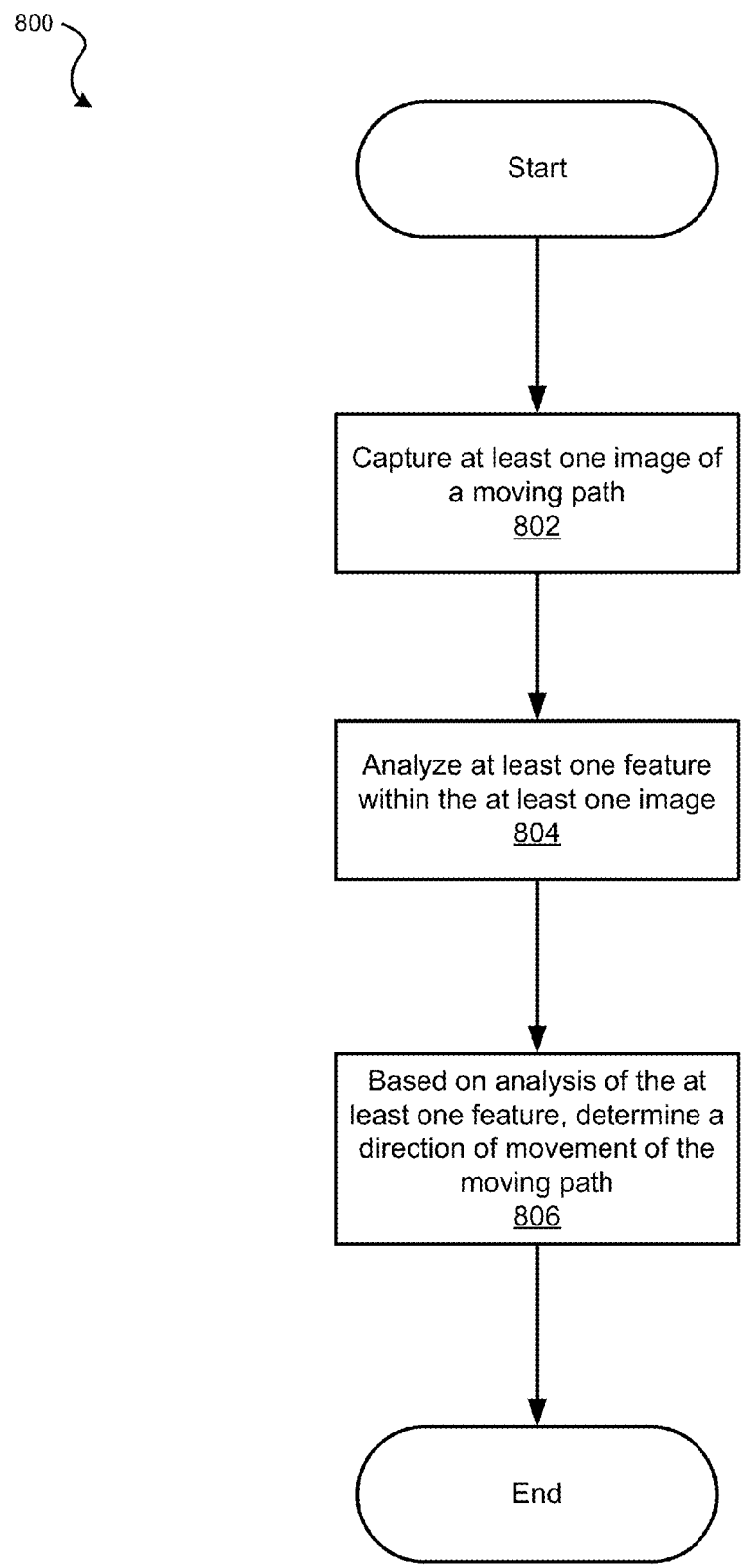
FIG. 8 is an exemplary flowchart describing a method for determining a direction of movement of a moving path, in accordance with some embodiments.

FIG. 8 is an exemplary flowchart 800 describing a method for determining a direction of movement of a moving path. In block 802, at least one image of a moving path is captured. The image of the moving path may be captured using an image capture device such as a camera on a mobile device. The moving path may be any conveyable path configured to transport a user (e.g., escalator, moving walkway, etc.). The mobile device may also include a depth sensor coupled the camera operable to calculate depth information in the image captured by the camera. Further, the mobile device may include a path detection module configured to recognize the moving path within the captured image. A user may point the mobile device at the moving path in order to capture the image.

In block 804, at least one feature within the at least one image is analyzed. In some embodiments, the feature includes a body part of a person travelling on the moving path. The body part may be the person's face, or any other body part. A face detection module within the mobile device may be configured to detect and analyze the person's face. The person's face may be detected and analyzed by capturing the image from a front view of the person's face or from a side profile view of the person's face. Based on the detection of the person's face, the face detection module may determine whether the person on the moving path is travelling toward or away from the user holding the mobile device.

In some embodiments, the feature within the images is tracked using optical flow techniques well known in the art. Movement of the feature within the images is tracked by tracking aspects of the feature such as, but not limited to, feature points, color clusters, shading, etc. This may be performed by an optical flow module within the mobile device. The captured images may be continuous, for example, video of the moving path captured by the camera. For example, a pixel or group of pixels part of a person within the images may be tracked over a series of frames. A determination may be made by the optical flow module, based on the tracked feature, as to whether the object within the image is travelling toward or away from the user using holding the mobile device.

In block 806, based on the analysis of the at least one feature, a direction of movement of the moving path is determined. An inference module within the mobile device is configured to determine/make an inference about the direction of movement of the moving path. The path detection module, face detection module, and context detection module may all communicate with the inference module. The various modules may communicate information about analysis of the feature within the image to the inference module. For example, the face detection module may communicate to the inference module information about face detection within the image and whether the person on the moving path is travelling toward or away from the user. In another example, the optical flow module may communicate to the inference module information about the tracked feature/object within the image and whether the feature/object is travelling toward or away from the user. The inference module may user this information to make a determination/inference about the motion direction of the moving path.

In some embodiments, an augmented reality advertisement may be displayed on a display of the mobile device showing a camera view of the moving path. The placement and content of the advertisement is based on the determination about the motion direction of the moving path. For example, if a moving path is detected to be moving away from the user, the advertisement content may include advertisements for stores or vendors located in the direction of the moving path. Likewise, if the moving path is moving toward the user, advertisement content may include advertisements for stores or vendors located behind the user. In some embodiments, the determination of the user's position relative to an inclined path (FIG. 9) may be combined with the determination of the direction of the moving path in order to appropriately place the advertisement content. In some embodiments, the advertisement content may also be played audibly via a speaker within the mobile device.

In some embodiments, navigation directions may be displayed on the display of the mobile device. The navigation directions may assist the vision impaired or be used for robot vision. The navigation directions may take into account the motion direction of the moving path in order to provide proper navigation routes.

Figure 9:
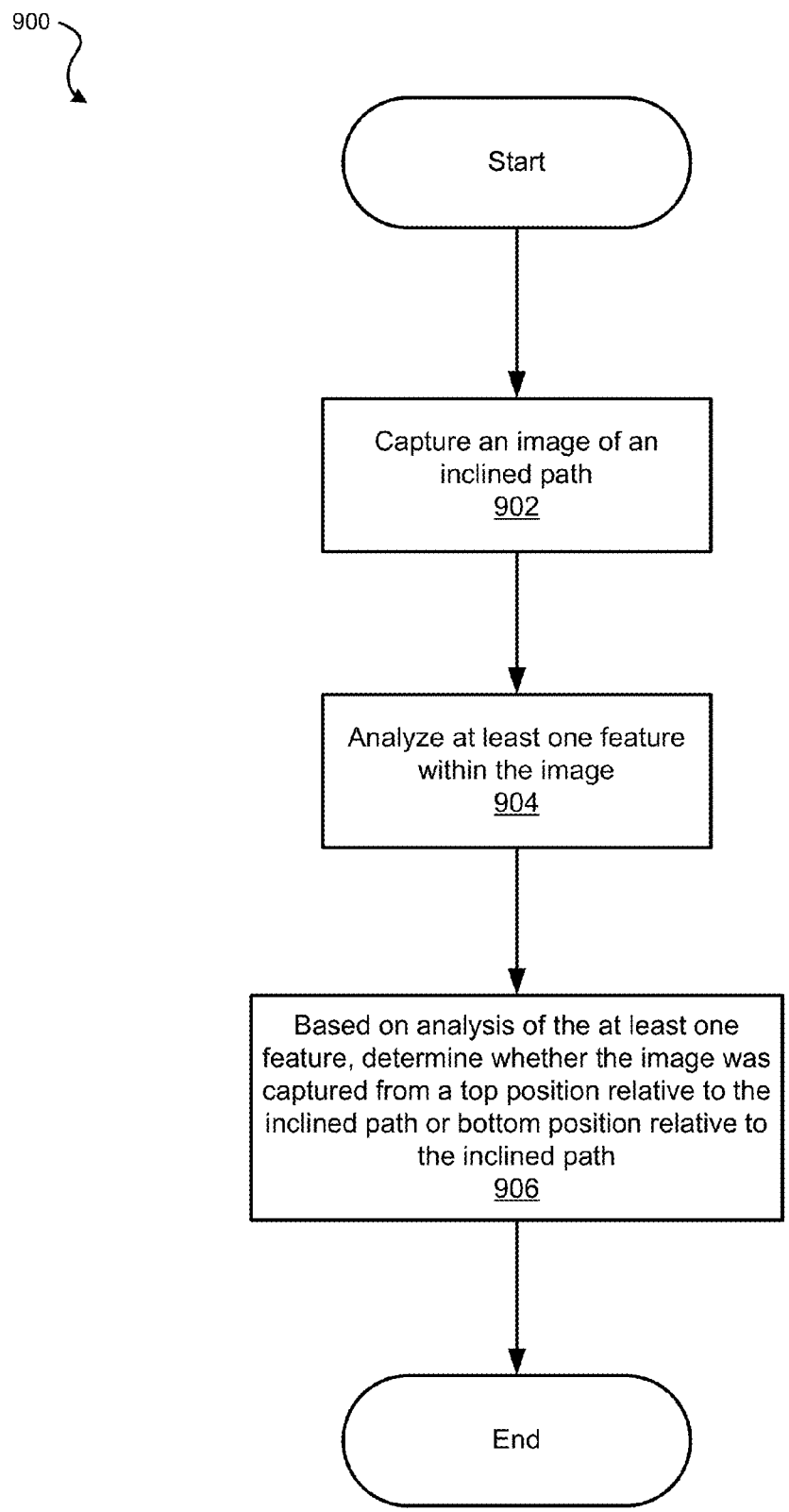
FIG. 9 is an exemplary flowchart describing a method for determining a location of a user relative to an inclined path, in accordance with some embodiments.

FIG. 9 is an exemplary flowchart 900 describing a method for determining a location of a user relative to an inclined path. In block 902, an image of an inclined path is captured. The image of the inclined path may be captured using an image capture device such as a camera on a mobile device. The inclined path may be any conveyable path configured to transport a user (e.g., escalator, moving walkway, etc.). The mobile device may also include a depth sensor coupled the camera operable to calculate depth information in the image captured by the camera. Further, the mobile device may include a path detection module configured to recognize the inclined path within the captured image. A user may point the mobile device at the inclined path in order to capture the image.

In block 904, at least one feature within the image is analyzed. In some embodiments, the feature within the image is contextual information. Contextual information may be any information within the image that may be detected and analyzed. For example, contextual information may include, but is not limited to, hanging picture frames on a wall adjacent to the moving path. The hanging picture frame may be analyzed, by a context detection module within the mobile device, against a reference horizon line to calculate an angle between an edge of the picture frame and the horizon line from the point of view of the camera.

In some embodiments, a tilt detection module is configured to detect a tilt angle of the mobile device being held by the user. An accelerometer within the mobile device communicates with the tilt detection module and provides gravity information. Based on the gravity information, the tilt detection module can detect whether the user is tilting the mobile device forward or backward when capturing the image of the inclined path. A typical user tends to tilt the mobile device backward when capturing the inclined path from the bottom of the inclined path and forward when capturing the inclined path from the top of the inclined path.

In block 906, based on the analysis of the at least one feature, a determination is made whether the image was captured from a top position relative to the inclined path or a bottom position relative to the inclined path. In some embodiments, the inference module may determine whether a user is located at the bottom or top of the inclined path based on the calculated angle communicated to the inference module by the context detection module. If the calculated angle between an edge of the picture frame and the horizon line is greater than or equal to 90 degrees, a determination/inference may be made that the user is at the bottom of the inclined path. Similarly, if the calculated angle between an edge of the picture frame and the horizon line is less than 90 degrees, a determination/inference may be made that the user is at the top of the inclined path.

In some embodiments, the inference module may determine whether a user is located at the bottom or top of the inclined path based on the tilt angle communicated to the inference module by the tilt detection module. If the mobile device is determined to be tilting forward, a determination/inference that the user is at the top of the inclined path is made. Similarly, if the mobile device is tilted backward, a determination/inference that the user is at the bottom of the inclined path is made.

In some embodiments, an augmented reality advertisement may be displayed on a display of the mobile device showing a camera view of the inclined path. The placement and content of the advertisement is based on the determination of the user's location relative to the inclined path. For example, if the user is determined to be at the top of the inclined path, the advertisement content may include advertisements for stores or vendors below the user, e.g., down the inclined path. However, if the user is determined to be at the bottom of the inclined path, the advertisement content may include advertisements for stores or vendors above the user, e.g., up the inclined path. In some embodiments, the advertisement content may also be played audibly via a speaker within the mobile device.

In some embodiments, navigation directions may be displayed on the display of the mobile device. The navigation directions may assist the vision impaired or be used for robot vision. The navigation directions may take into account the motion direction of the inclined path in order to provide proper navigation routes.

Figure 10:
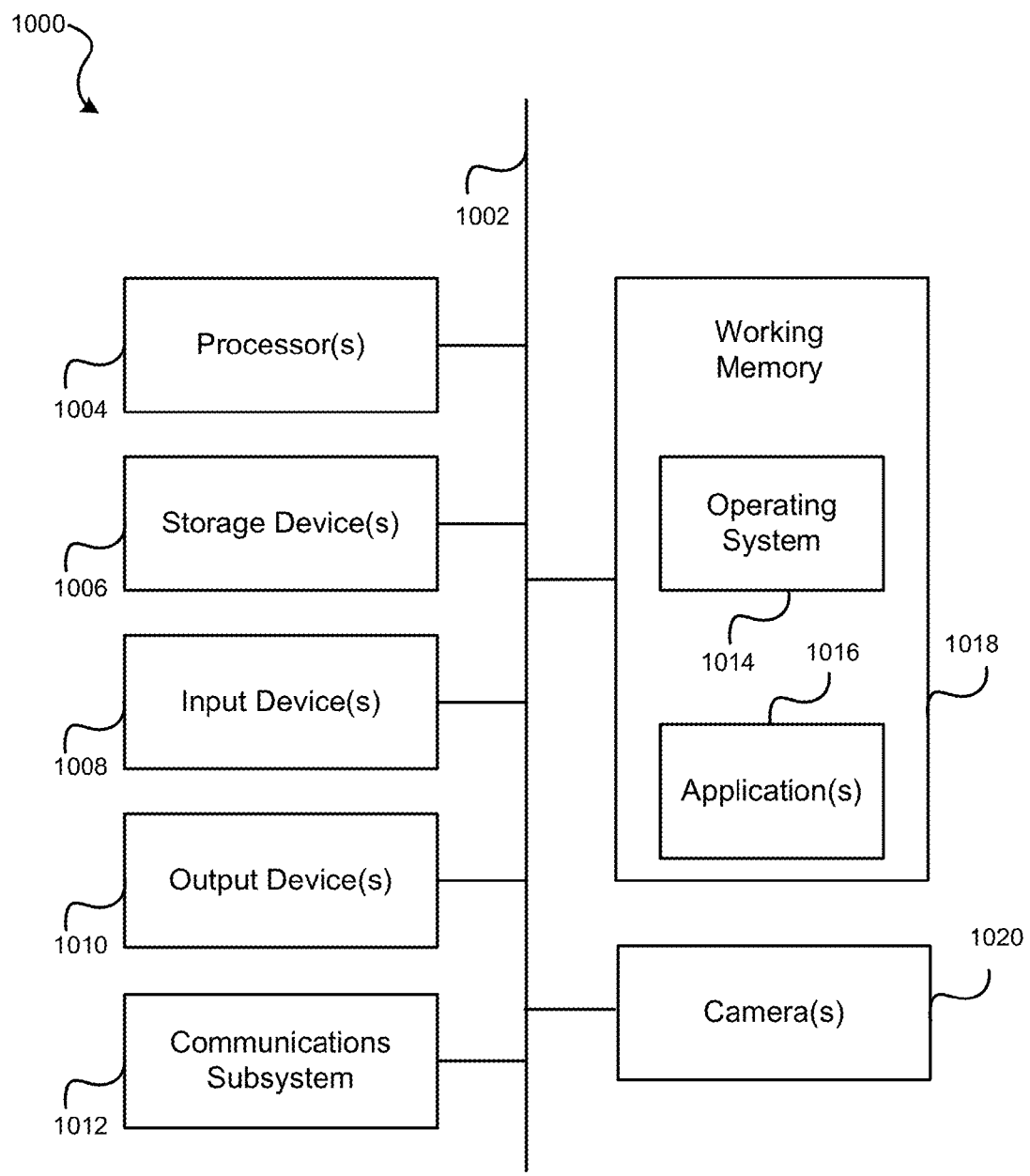
FIG. 10 illustrates an example of a computing system in which one or more embodiments may be implemented.

FIG. 10 illustrates an example of a computing system in which one or more embodiments may be implemented. A computer system as illustrated in FIG. 10 may be incorporated as part of the above described computerized device. For example, computer system 1000 can represent some of the components of a television, a computing device, a server, a desktop, a workstation, a control or interaction system in an automobile, a tablet, a netbook or any other suitable computing system. A computing device may be any computing device with an image capture device or input sensory unit and a user output device. An image capture device or input sensory unit may be a camera device. A user output device may be a display unit. Examples of a computing device include but are not limited to video game consoles, tablets, smart phones and any other hand-held devices. FIG. 10 provides a schematic illustration of one embodiment of a computer system 1000 that can perform the methods provided by various other embodiments, as described herein, and/or can function as the host computer system, a remote kiosk/terminal, a point-of-sale device, a telephonic or navigation or multimedia interface in an automobile, a computing device, a set-top box, a table computer and/or a computer system. FIG. 10 is meant only to provide a generalized illustration of various components, any or all of which may be utilized as appropriate. FIG. 10, therefore, broadly illustrates how individual system elements may be implemented in a relatively separated or relatively more integrated manner. In some embodiments, computer system 1000 may be used to implement mobile device 100 (FIG. 1) or a server computer of the content provider.

The computer system 1000 is shown comprising hardware elements that can be electrically coupled via a bus 1002 (or may otherwise be in communication, as appropriate). The hardware elements may include one or more processors 1004, including without limitation one or more general-purpose processors and/or one or more special-purpose processors (such as digital signal processing chips, graphics acceleration processors, and/or the like); one or more input devices 1008, which can include without limitation one or more cameras, sensors, a mouse, a keyboard, a microphone configured to detect ultrasound or other sounds, and/or the like; and one or more output devices 1010, which can include without limitation a display unit such as the device used in embodiments of the invention, a printer and/or the like. Additional cameras 1020 may be employed for detection of user's extremities and gestures. In some implementations, input devices 1008 may include one or more sensors such as infrared, depth, and/or ultrasound sensors.

In some implementations of the embodiments of the invention, various input devices 1008 and output devices 1010 may be embedded into interfaces such as display devices, tables, floors, walls, and window screens. Furthermore, input devices 1008 and output devices 1010 coupled to the processors may form multi-dimensional tracking systems.

The computer system 1000 may further include (and/or be in communication with) one or more non-transitory storage devices 1006, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1000 might also include a communications subsystem 1012, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1012 may permit data to be exchanged with a network, other computer systems, and/or any other devices described herein. In many embodiments, the computer system 1000 will further comprise a non-transitory working memory 1018, which can include a RAM or ROM device, as described above.

The computer system 1000 also can comprise software elements, shown as being currently located within the working memory 1018, including an operating system 1014, device drivers, executable libraries, and/or other code, such as one or more application programs 1016, which may comprise computer programs provided by various embodiments, and/ or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1006 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some embodiments, one or more elements of the computer system 1000 may be omitted or may be implemented separate from the illustrated system. For example, the processor 1004 and/or other elements may be implemented separate from the input device 1008. In one embodiment, the processor is configured to receive images from one or more cameras that are separately implemented. In some embodiments, elements in addition to those illustrated in FIG. 10 may be included in the computer system 1000.

Some embodiments may employ a computer system (such as the computer system 1000) to perform methods in accordance with the disclosure. For example, some or all of the procedures of the described methods may be performed by the computer system 1000 in response to processor 1004 executing one or more sequences of one or more instructions (which might be incorporated into the operating system 1014 and/or other code, such as an application program 1016) contained in the working memory 1018. Such instructions may be read into the working memory 1018 from another computer-readable medium, such as one or more of the storage device(s) 1006. Merely by way of example, execution of the sequences of instructions contained in the working memory 1018 might cause the processor(s) 1004 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 1000, various computer-readable media might be involved in providing instructions/code to processor(s) 1004 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1006. Volatile media include, without limitation, dynamic memory, such as the working memory 1018. Transmission media include, without limitation, coaxial cables, copper wire and fiber optics, including the wires that comprise the bus 1002, as well as the various components of the communications subsystem 1012 (and/or the media by which the communications subsystem 1012 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1004 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1012 (and/or components thereof) generally will receive the signals, and the bus 1002 then might carry the signals (and/or the data, instructions, etc. carried by the signals) to the working memory 1018, from which the processor(s) 1004 retrieves and executes the instructions. The instructions received by the working memory 1018 may optionally be stored on a non-transitory storage device 1006 either before or after execution by the processor(s) 1004.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figures. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Thus, in the description above, functions or methods that are described as being performed by the computer system may be performed by a processor—for example, the processor 1004—configured to perform the functions or methods. Further, such functions or methods may be performed by a processor executing instructions stored on one or more computer readable media.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method for image-based status determination, comprising:
    capturing, via a mobile device, at least one image of a moving path;
    analyzing, via the mobile device, at least one feature within the at least one image;
    based on analysis of the at least one feature, determining, via the mobile device, a direction of movement of the moving path; and
    displaying, on a display of the mobile device, an advertisement along the moving path within a representation of the captured image based on the determined direction of movement of the moving path.

2. The method of claim 1 wherein the at least one feature comprises a body part of a person on the moving path.

3. The method of claim 1 wherein the at least one feature comprises an object adjacent to the moving path.

4. The method of claim 1 further comprising tracking and comparing the at least one feature between a plurality of the images.

5. The method of claim 1 further comprising displaying navigation directions on the mobile device based on the determined direction of movement of the moving path.

6. An apparatus for image-based status determination, comprising:
    an image capture device configured to capture at least one image of a moving path;
    a processor and a display device coupled to the image capture device;
    the processor configured to:
        analyze at least one feature within the at least one image;
        determine a direction of movement of the moving path based on analysis of the at least one feature; and
        command display, on the display device, of an advertisement along the moving path within a representation of the captured image based on the determined direction of movement of the moving path.

7. The apparatus of claim 6 wherein the at least one feature comprises a body part of a person on the moving path.

8. The apparatus of claim 6 wherein the at least one feature comprises an object adjacent to the moving path.

9. The apparatus of claim 6 wherein the processor is further configured to track and compare the at least one feature between a plurality of the images.

10. The apparatus of claim 6 wherein the processor is further configured to display navigation directions on the mobile device based on the determined direction of movement of the moving path.

11. An apparatus for image-based status determination, comprising:
    means for capturing at least one image of a moving path;
    means for analyzing at least one feature within the at least one image;
    means for, based on analysis of the at least one feature, determining a direction of movement of the moving path; and
    means for displaying an advertisement along the inclined path within a representation of the captured image based on the determined position from where the image was captured.

12. A processor-readable medium comprising processor-readable instructions configured to cause a processor to:
    capture at least one image of a moving path;
    analyze at least one feature within the at least one image;
    based on analysis of the at least one feature, determine a direction of movement of the moving path; and
    command display, on a display device, of an advertisement along the inclined path within a representation of the captured image based on the determined position from where the image was captured.

13. A method for image-based status determination, comprising:
    capturing, via a mobile device, an image of an inclined path;
    analyzing, via the mobile device, at least one feature within the image;
    based on analysis of the at least one feature, determining, via the mobile device, whether the image was captured from a top position relative to the inclined path or bottom position relative to the inclined path; and
    displaying, on a display of the mobile device, an advertisement along the inclined path within a representation of the captured image based on the determined position from where the image was captured.

14. The method of claim 13 wherein the determining step comprises detecting an object adjacent to the inclined path and determining an angle of the object with respect to a horizon line.

15. The method of claim 13 further comprising determining a tilt angle of a device used to capture the image, and wherein determination of whether the image was from a top position or bottom position is further based on the tilt angle.

16. The method of claim 13 further comprising displaying navigation directions on the mobile device based on the determined position from where the image was captured.

17. An apparatus for image-based status determination, comprising:
- an image capture device configured to capture at least one image of an inclined path;
- a processor and a display device coupled to the image capture device;
- the processor configured to:
  - analyze at least one feature within the image; and
  - determine whether the image was captured from a top position relative to the inclined path or bottom position relative to the inclined path based on analysis of the at least one feature; and
  - command display, on the display device, of an advertisement along the inclined path within a representation of the captured image based on the determined position from where the image was captured.

18. The apparatus of claim 17 wherein the determining step comprises detecting an object adjacent to the inclined path and determining an angle of the object with respect to a horizon line.

19. The apparatus of claim 17 wherein the processor is further configured to determine a tilt angle of a device used to capture the image, and wherein determination of whether the image was from a top position or bottom position is further based on the tilt angle.

20. The apparatus of claim 17 wherein the processor is further configured to display navigation directions on the mobile device based on the determined position from where the image was captured.

21. An apparatus for image-based status determination, comprising:
- means for capturing an image of an inclined path;
- means for analyzing at least one feature within the image;
- means for, based on analysis of the at least one feature, determining whether the image was captured from a top position relative to the inclined path or bottom position relative to the inclined path; and
- means for displaying an advertisement along the inclined path within a representation of the captured image based on the determined position from where the image was captured.

22. A processor-readable medium comprising processor-readable instructions configured to cause a processor to:
- capture an image of an inclined path;
- analyze at least one feature within the image;
- based on analysis of the at least one feature, determine whether the image was captured from a top position relative to the inclined path or bottom position relative to the inclined path; and
- command display, on a display device, of an advertisement along the inclined path within a representation of the captured image based on the determined position from where the image was captured.

* * * * *